(12) United States Patent
Perini (10) Patent No.: US 7,165,666 B2
(45) Date of Patent: Jan. 23, 2007

(54) BUFFER STORAGE UNIT FOR TUBES, ESPECIALLY CARDBOARD TUBES FOR THE PRODUCTION OF LOGS

(76) Inventor: Fabio Perini, Via S. Francesco 1, I-55049, Viareggio (Lucca) (IT)

( * ) Notice: Subject to any disclaimer, the term of this patent is extended or adjusted under 35 U.S.C. 154(b) by 107 days.

(21) Appl. No.: 10/530,363

(22) PCT Filed: Oct. 17, 2003

(86) PCT No.: PCT/IT03/00639

§ 371 (c)(1),
(2), (4) Date: Apr. 4, 2005

(87) PCT Pub. No.: WO2004/041689

PCT Pub. Date: May 21, 2004

(65) Prior Publication Data

US 2006/0163031 A1    Jul. 27, 2006

(30) Foreign Application Priority Data

Nov. 8, 2002  (IT) ............................ FI2002A0219

(51) Int. Cl.
*B65G 37/00* (2006.01)
(52) U.S. Cl. ................................................. 198/347.4
(58) Field of Classification Search ............ 198/347.1, 198/347.3, 347.4
See application file for complete search history.

(56) References Cited

U.S. PATENT DOCUMENTS

| 327,868 A | 10/1885 | Dickerson | |
|---|---|---|---|
| 4,359,149 A * | 11/1982 | Erlichman et al. | 198/347.1 |
| 4,964,498 A * | 10/1990 | Klingl | 198/347.1 |
| 4,995,769 A * | 2/1991 | Berger et al. | 414/403 |
| 5,013,022 A * | 5/1991 | Graushar | 270/56 |
| 5,038,909 A * | 8/1991 | Covert | 198/347.3 |
| 5,088,588 A * | 2/1992 | Davis et al. | 198/347.3 |
| 5,176,242 A * | 1/1993 | Wegscheider | 198/347.3 |
| 5,253,743 A * | 10/1993 | Haas et al. | 198/347.1 |
| 5,473,978 A * | 12/1995 | Colombo | 99/443 C |
| 5,636,722 A * | 6/1997 | Koop | 198/347.1 |
| 5,746,300 A * | 5/1998 | Brizzi et al. | 198/347.3 |
| 6,053,304 A | 4/2000 | Giagiotti | |
| 6,223,881 B1 * | 5/2001 | Carle | 198/347.3 |

(Continued)

FOREIGN PATENT DOCUMENTS

EP    0 470 538    2/1992

(Continued)

*Primary Examiner*—Joe Dillon, Jr.
(74) *Attorney, Agent, or Firm*—McGlew & Tuttle, PC (57) ABSTRACT

Store for stocking tubes therein, comprising means (4) for feeding tubes (1) into the store, and means (7) for unloading the tubes (1) therefrom, the store being located between said supply means (4) and said unloading means (7), characterized in that it comprises a plurality of supports (8) each of which defines a plane inclined towards said unloading means (7) and able to receive a plurality of tubes (1) from said supply means (4): each of said supports (8) being movable between a stand-by position where it is empty, a position of transit of tubes (1) in which it defines an inclined plane, which connects said tube-supplying means (4) said tube-unloading means (7), and a stock position in which it is full up.

7 Claims, 8 Drawing Sheets

U.S. PATENT DOCUMENTS

| | | | | |
|---|---|---|---|---|
| 6,640,960 B1 * | 11/2003 | Spettl | ....................... | 198/347.1 |
| 6,758,321 B2 * | 7/2004 | Spettl | ....................... | 198/347.1 |
| 6,817,464 B2 * | 11/2004 | Biondi et al. | ............ | 198/347.1 |
| 6,840,368 B2 * | 1/2005 | Betti et al. | ................ | 198/347.3 |
| 7,073,655 B2 * | 7/2006 | Bruni et al. | ................. | 198/429 |

FOREIGN PATENT DOCUMENTS

| | | |
|---|---|---|
| GB | 2 011 870 | 7/1979 |
| JP | 56-113603 | 9/1981 |

* cited by examiner

BUFFER STORAGE UNIT FOR TUBES, ESPECIALLY CARDBOARD TUBES FOR THE PRODUCTION OF LOGS

The present invention refers to a storage unit for tubes, especially cardboard tubes for the production of logs.

A log is known to consist of a paper sheet of predetermined width and length, which is wound over a tubular cardboard core. The machines for the production of logs, so-called "rewinders", therefore, provide for supplying paper as well as tubes over which the paper is to be wound. Upstream of the reminders, the production of tubes, intended to make up the cores of the logs, is ensured by tube-forming machines. Provided downstream of the rewinders are further machines, so-called cutting-off machines, by means of which the logs are subdivided into elements of reduced length, that is, of commercial size.

The present invention refers in particular to the supply of tubes to be fed into the rewinders, and has the object of supplying the latter with tubes in a constant, efficient and reliable manner.

This result has been achieved, according to the invention, by adopting the idea of making an apparatus having the characteristics indicated in the claim 1. Further characteristics being set forth in the dependent claims.

The apparatus according to the present invention is relatively simple to make, cost-effective and reliable even after a prolonged service life. Besides, it allows a rational supply of the tubes by ensuring a constant flow thereof to the associated rewinders also when the capacity of the latter is varied.

These and other advantages and characteristics of the invention will be best understood by anyone skilled in the art from a reading of the following description in conjunction with the attached drawings given as a practical exemplification of the invention, but not to be considered in a limitative sense, wherein.

Reduced to its basic structure and reference being made to the accompanying drawings, a storage unit for cardboard tubes according to the invention has an inlet section (I) and an outlet section for the tubes (1), and an intermediate station (A) in correspondence of which more tubes (1) can stand by, awaiting for the unloading thereof through the outlet section (U).

In correspondence of said inlet station (I) provision is made for a conveyor (2) which transport the tubes (1) arriving from a tube-forming machine (known per se and not shown in the figures of the attached drawings).

Provided laterally of the conveyor (2) is a chute (3) which connects the same conveyor (2) to a device (4) which removes and drives out the tubes (1). Such device (4) is intended for transferring the tubes (1) from the conveyor (2) to the intermediate station (A), that is, it has the function of supplying the station (A) with tubes (1) coming from the tube-forming machine.

According to the embodiment exemplified in the figures of the attached drawings, the said device (4) consists of a plurality of horizontal brackets (40) mounted on a plurality of parallel chains (41) ring-like closed onto corresponding pulleys (42, 43) having horizontal axis and associated with an electric motor (44), so that the ascending section of the chains (41) will result on the side of the conveyer (2) and the descending section will result on the side of the station (A).

Similarly, in correspondence of the outlet section (U), provision is made for a conveyor (5) for transporting, towards one or more rewinders (not shown in the drawings), the tubes (1) unloaded from the intermediate station (A). Provided laterally of said conveyor (5) is a chute (6) which connects the same conveyor (5) with a device (7) intended for transferring the tubes (1) from the intermediate station (A) to the conveyor (5), that is, for supplying the latter with tubes (1) unloaded from the intermediate station (A). The said device (7) is substantially identical to the device (4) above described, that is, it comprises a plurality of brackets (40'), mounted on a plurality of parallel chains (41') ring-like closed onto corresponding pulleys (42', 43') having horizontal axis and associated with an electric motor (44') so that the ascending section of the chains (41') will result on the side of the station (A) and the descending section thereof will result on the side of the conveyor (5).

In correspondence of the station (A) which results between the section (I) and the section (U) for the introduction and exit, respectively, of tubes (1), a store of variable geometry is located, the configuration of said store being able to change according to the amount of tubes (1) which can be accommodated downstream, and corresponding to the number of tubes that the rewinders have to be supplied with.

According to the example illustrated in the figures of the attached drawings, the said store comprises a plurality of supports (8), each of which is made up of a central bar or cross-piece (80) on which more rods (81) are fixed orthogonally thereto to cooperate with each other and define a resting plane for a plurality of tubes (1), the said supports being oriented downwardly, that is, with the front edges (810) of the rods (81) further down than the rear edges (811), so that the said resting plane is an inclined plane. The front edge (810) of each rod (81) is suitably L-bent upwards to prevent the tubes (1) resting against it from spontaneously getting over it.

The distance (d) of one rod (81) from another is suitably chosen so as to form an opening of preset width therebetween. The ends of said bars (80) are kept guided between two pairs of uprights (82). To this end, in correspondence of each end of each bar (80), a flat diagonal element (83, 84) is fixed the ends (830, 840) of which are made to slide onto the inner walls of the uprights (82): the diagonal elements (83, 84) of each bar (80) being mutually crossed, that is, differently inclined relative to the plane defined by the support (8).

Figure 4A:
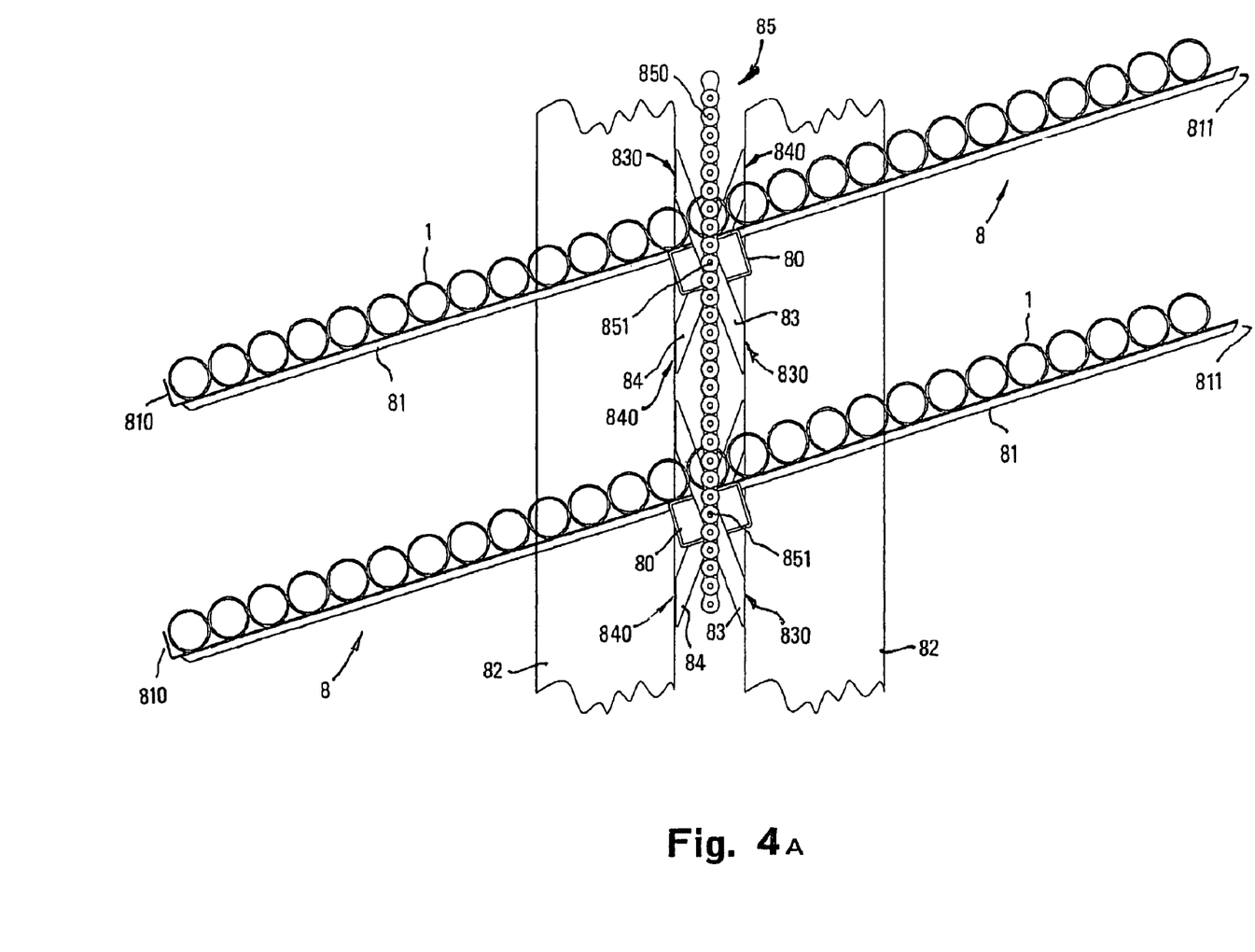
FIG. 4A shows an enlarged detail of the drawing in FIG. 1.
Figure 4B:
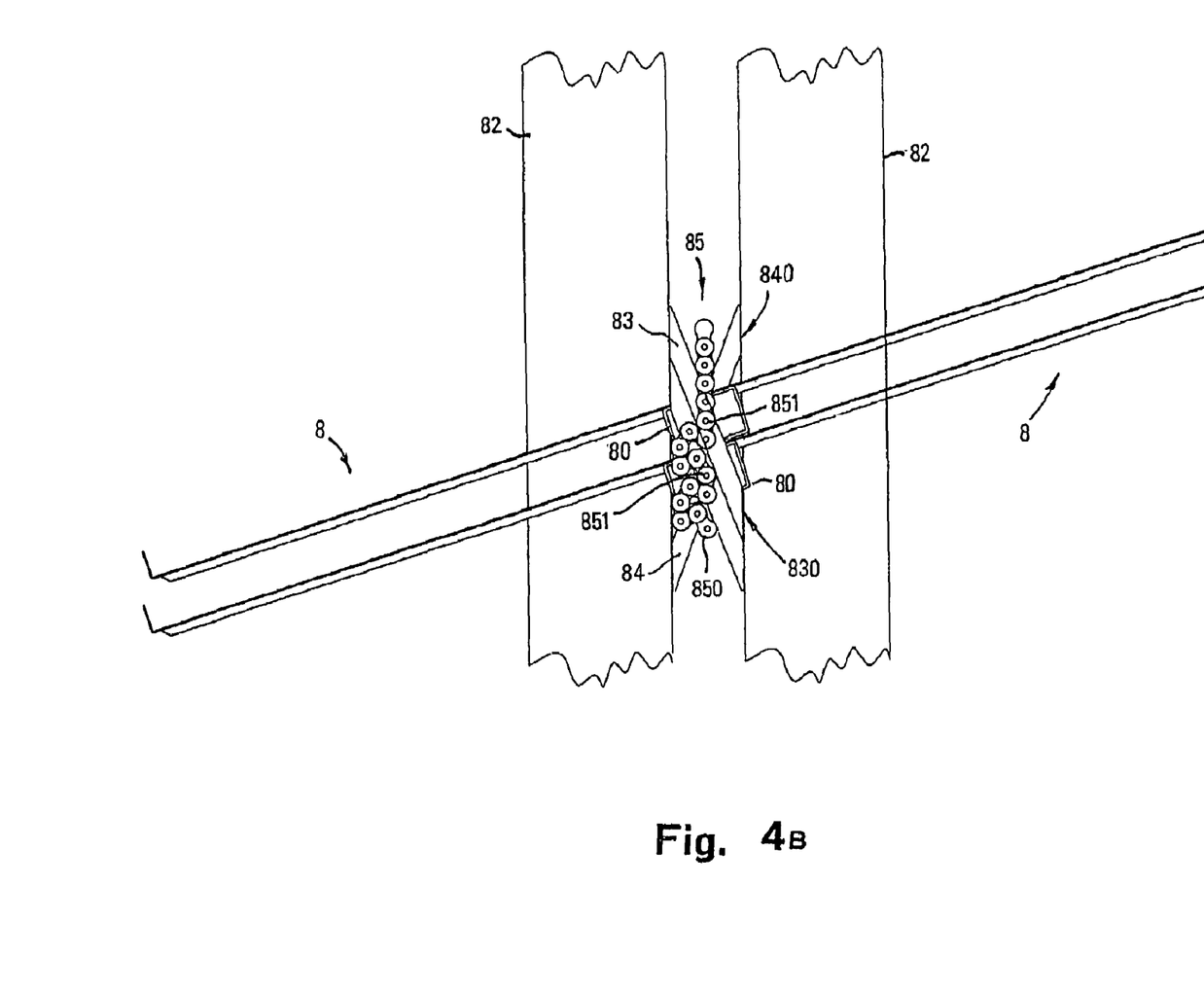
FIG. 4B shows an enlarged detail of the drawing in FIG. 2.

Moreover, the said supports (8) are mutually engaged by means of two open side chains (85). More particularly, and as illustrated in FIGS. 4A and 4B, the chains (85) are made up of a plurality of links (850) and the diagonal elements (83, 84) of each bar are engaged with selected links of the two chains via corresponding anchoring pivots (851), so that the supports (8) will result hooked up to the two lateral chains in correspondence of the ends of each bar (80).

The said chains (85) are associated with a corresponding electric motor (86) acting from above.

Provided upstream and respectively downstream of station (A), are control photocell means (9, 90) whose function will be described later.

To allow the transfer of tubes (1), carried by the device (4), onto the supports (8) of station (A), provision is made for a plurality of chutes (11) located at a preset distance from the base (B) of the apparatus, parallel to each other, oriented towards the station (A) and disposed staggered with respect to the rods (81) of supports (8) so as not to interfere therewith: the said chutes (11) being mounted between the device (4) and the station (A).

Similarly, to allow the transfer of tubes (1) from the supports (8) to the device (7) of the exit station (U), provision is made for a plurality of fixed chutes (12) disposed at a preset distance form said base (B), parallel to each other, oriented towards the device (7) and disposed staggered with respect to the rods (81) of supports (8) so as not to interfere therewith: the said chutes (12) being mounted between the station (A) and the device (7) and extending towards the station (A).

The transfer of tubes (1) from the device (4) to a support (8) standing by, takes place as follows: the descending branch of the chain (41) carries the tubes (1) onto the fixed chutes (11) which intercept them and cause them to roll over the stand-by support (8).

The transfer of tubes (1) from a support (8) to the device (7) takes place as follows: the tubes (1) roll over the inclined plane, defined by the support (8), towards the device (7), so that they pass onto the chutes (12) from which they are removed by means of brackets (40') of the ascending branch of chain (41').

Figure 1:
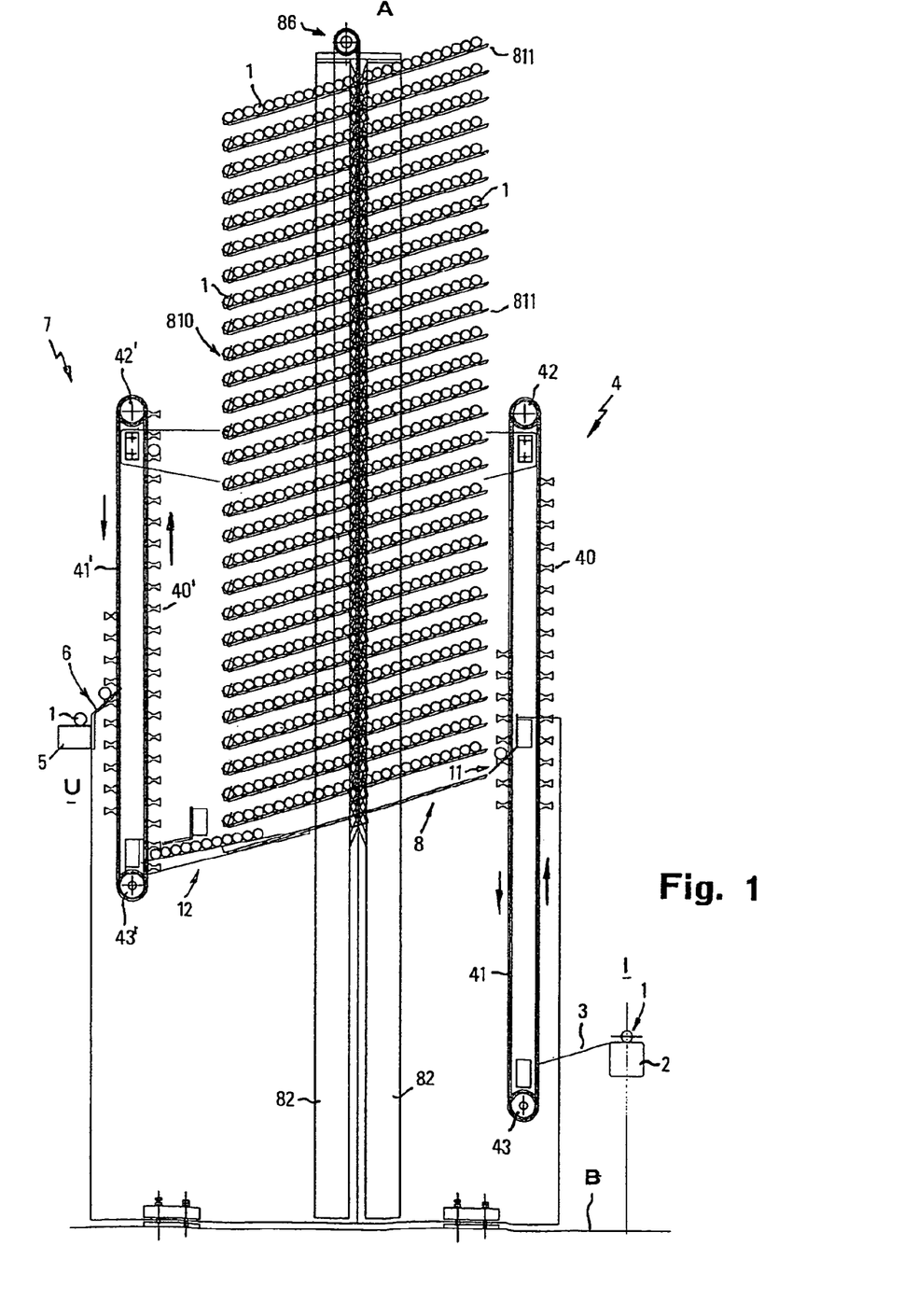
FIG. 1 is a schematic side view of the store being filled.
Figure 5A:
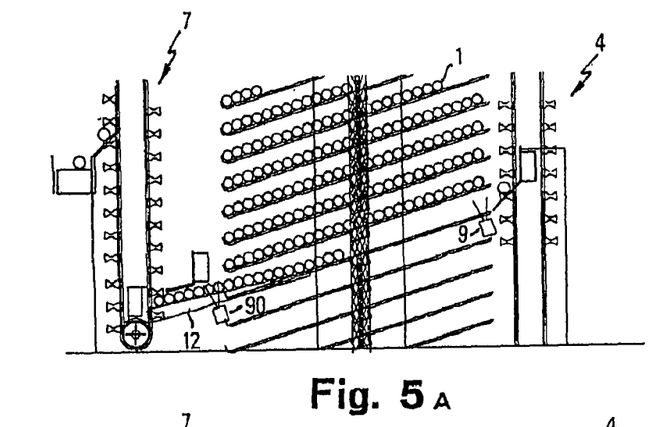
FIGS. 5A–5H show schematically possible states or operating conditions of the store.
Figure 5B:
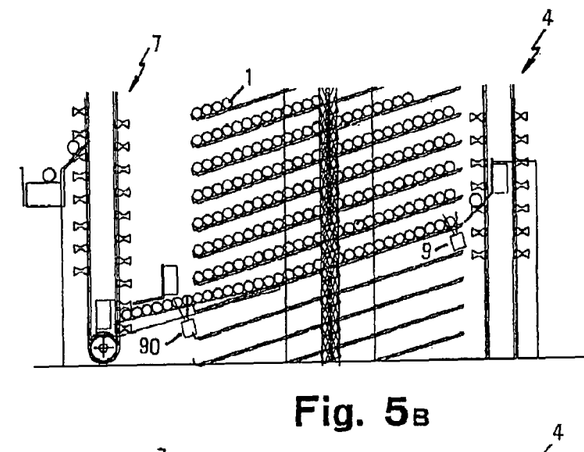
Figure 5C:
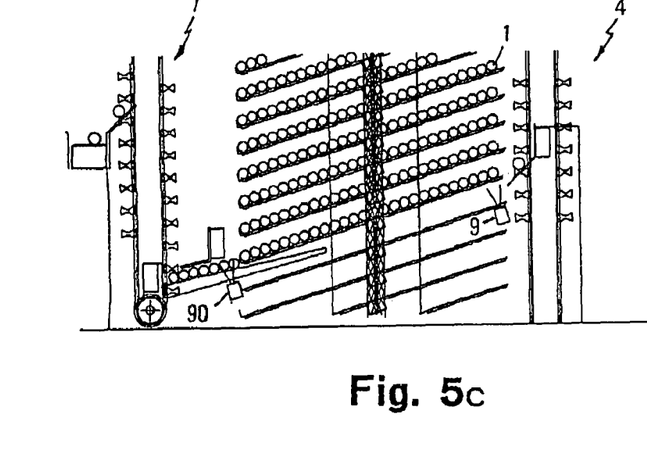
Figure 5D:
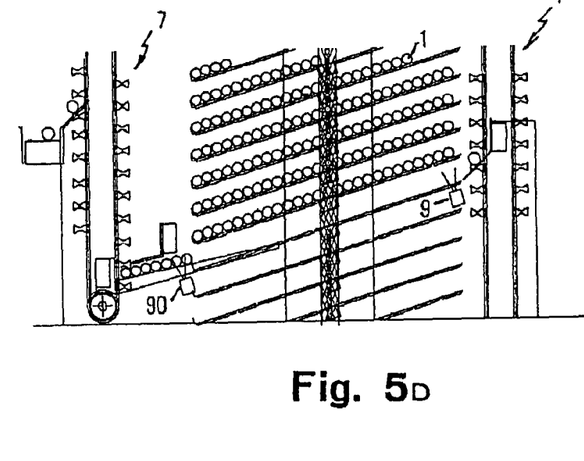

The operation of the storage unit is as follows. Starting from a condition such as the one shown in FIG. 5A, in which the number of tubes (1) received downstream of station (A) is less than the number of tubes supplied upstream, the tubes (1) pile up onto the "transit" support (8) (that is, on the support that ideally connects the chutes 11 and 12), until the photocell (9) detects a fill-up condition of the support (see FIG. 5B). At this point, the said chains (85) are pulled upwards by the motor (86), so that the filled support (8) moves upwards and its place is taken by the empty support (8) coming from below and which becomes, in turn, a transit support (FIGS. 5C, 5D). Once this support also is filled, the same procedure is repeated, until all the supports are filled up (see FIG. 1), in which case the device (4) will be deactivated.

Figure 2:
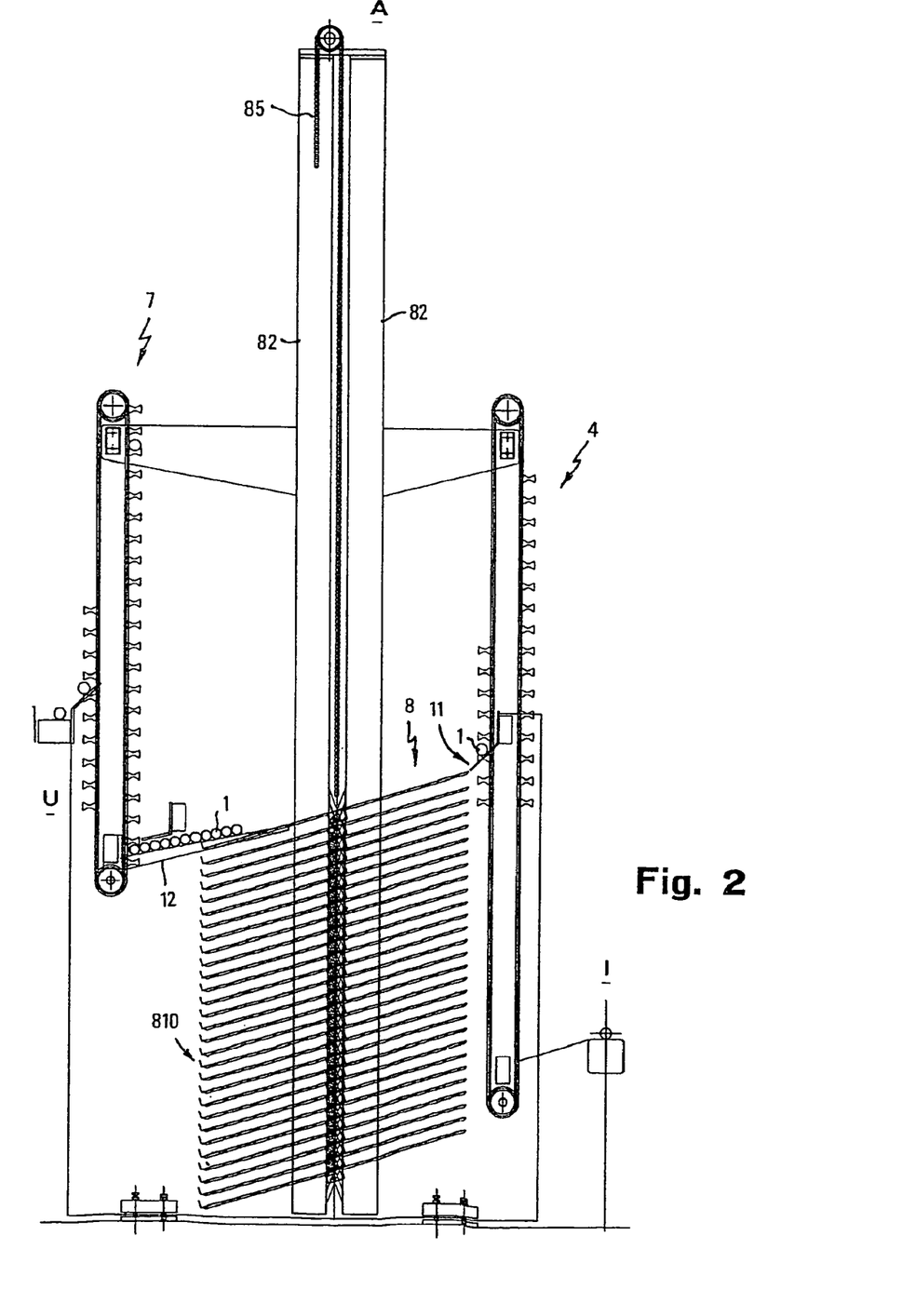
FIG. 2 shows the store of FIG. 1 in empty state.
Figure 3:
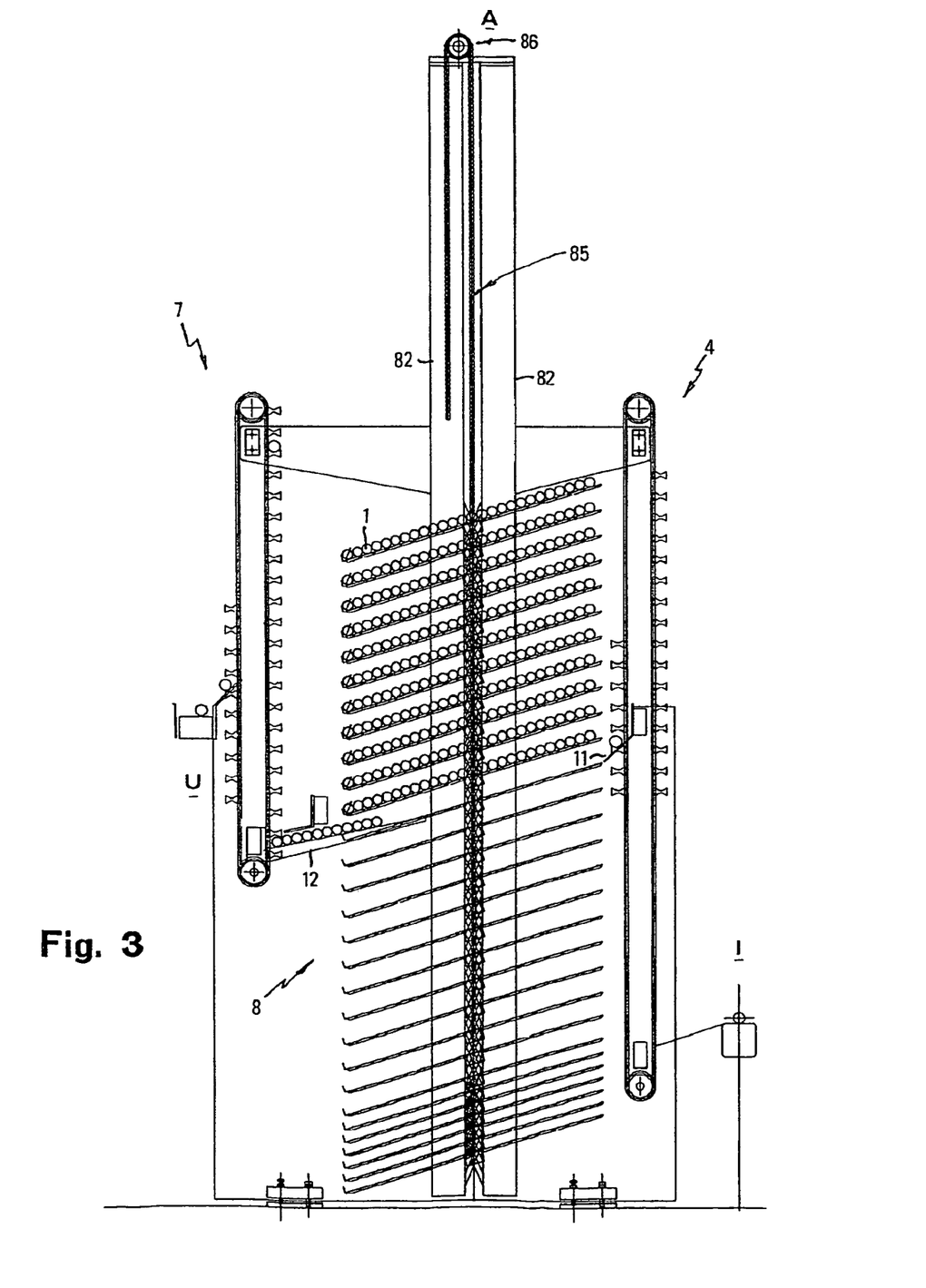
FIG. 3 shows the store of FIGS. 1 and 2 as the tubes are stocked therein.
Figure 5E:
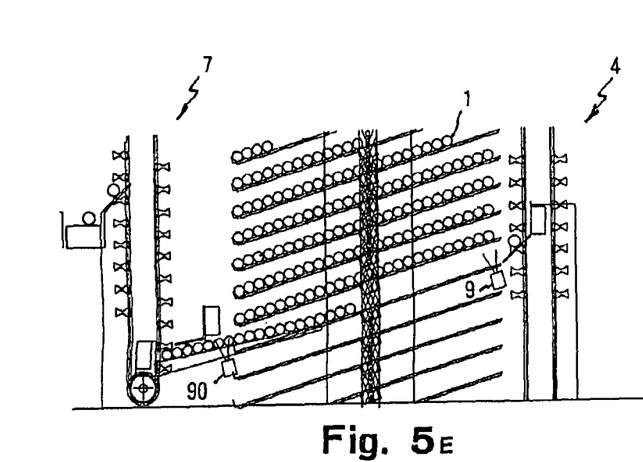
Figure 5F:
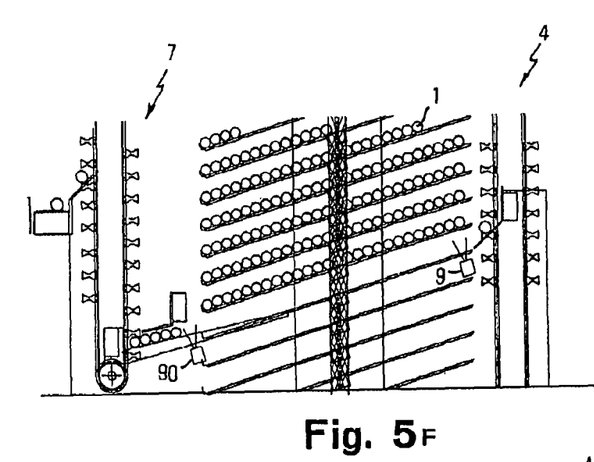
Figure 5G:
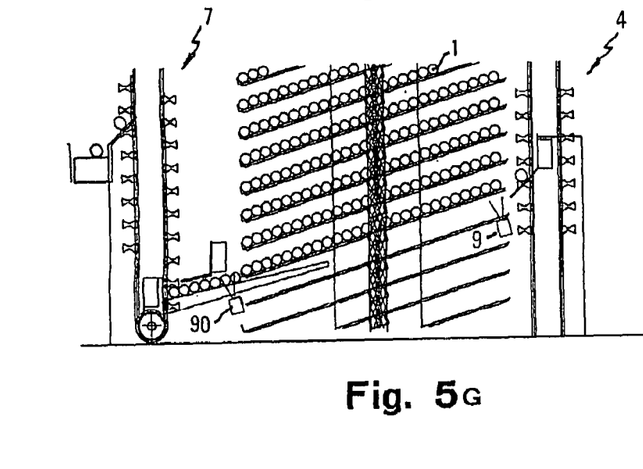
Figure 5H:
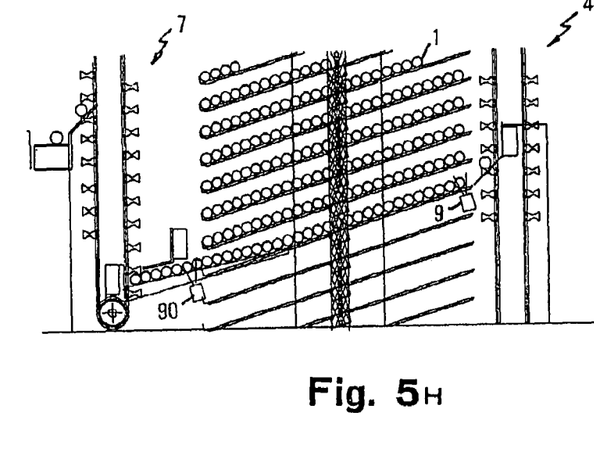
Figure 6:
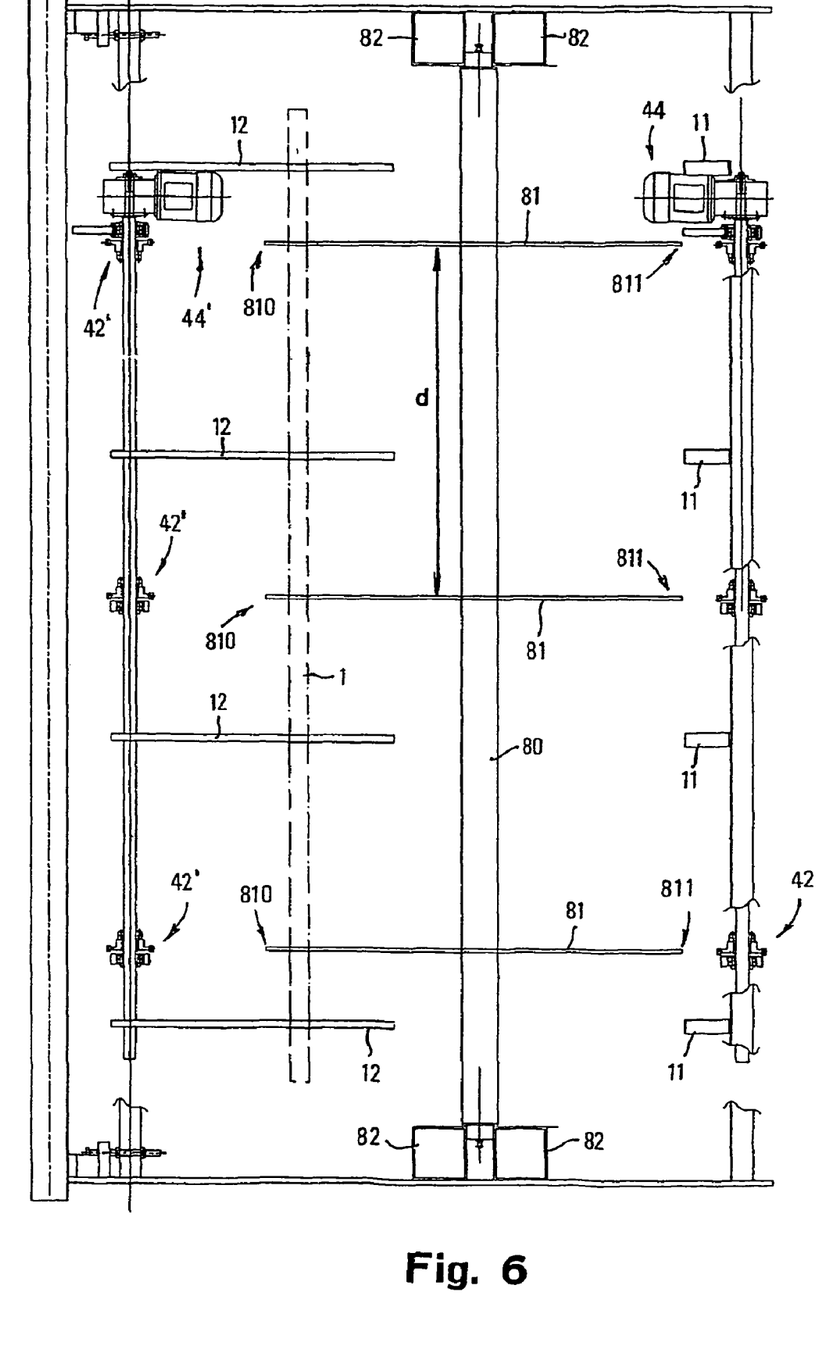
FIG. 6 is a schematic plan view of a store according to the invention.

Starting from a condition such as the one shown in FIG. 5E, in which the number of tubes (1) received downstream of station (A) is greater than the number of tubes (1) supplied by the device (4), the transit support (8) empties out, this condition being detected by the photocell (90) as illustrated in FIG. 5F. At this point, the motor (86) drives the chains (85) into a descending motion, so that the empty support moves downwards, and a filled support (8) coming from above takes the place of the empty one (FIGS. 5G, 5H). When also this support empties out, the same procedure is repeated, until the emptying out of the store is completed (see FIG. 2), in which case the device (7) will be deactivated.

If the number of tubes (1) received downstream of station A corresponds to that of the tubes fed upstream, the transit support (8) remains in its position.

Owing to the connection of the supports (8) made by connecting members having variable configuration (the side chains 85, in the illustrated example), the whole storage unit takes up a configuration varying according to the number of filled and respectively emptied out supports (8), since the supports (8), which are in stock condition, that is, result above the said "transit" plane, are spaced apart by an extent corresponding to the length of the stretched sections of the chains (85) which connect them (see FIG. 4A), whereas the supports (8) standing by, that is, resulting below the "transit" plane, are closer to each other (see FIG. 4B) because of the peculiar flexibility of the chains (85).

The variable geometry of the above described structure allows keeping the overall height of the store at a minimum.

In any case, whatever the configuration taken up by the store, a transit support (8) defines an inclined plane for connecting the device (4) with the device (7) for supplying, respectively, unloading of tubes (1) without solution of continuity.

Practically, the construction details may vary in any equivalent way as far as the shape, dimensions, elements disposition, nature of the used materials are concerned, without nevertheless departing from the scope of the adopted solution idea and, thereby, remaining within the limits of the protection granted to the present patent.

The invention claimed is:

1. Store for stocking tubes therein comprising:
   means for feeding tubes into the store, and means for unloading the tubes therefrom, the store being located between said feed means and said unloading means;
   a plurality of supports each of which defines a plane inclined towards said unloading means and able to receive a plurality of tubes from said supply means: each of said supports being movable between a stand-by position where it is empty, a position of transit of tubes in which it defines an inclined plane which connects said tube-supplying means to said tube-unloading means, and a stock position in which it is full up; each of said supports consisting of a central bar or cross-piece to which rods are fixed orthogonally thereto and the said supports being connected to each other via two open side chains, store characterized in that the said side chains are connected to said bars or cross pieces.

2. Store according to claim 1, characterized in that the movement for disposing said supports to said stand-by, transit and stock positions is developed in the vertical direction.

3. Store according to claim 1, characterized in that the said transit position is intermediate between the stand-by and stock positions.

4. Store according to claim 1, characterized in that in the said stand-by position, the said supports (8) result below said transit position.

5. Store according to claim 1, characterized in that, in correspondence of said means for feeding the tubes, provision is made for a plurality of fixed chutes oriented towards the store, and in that, in correspondence of said means for unloading the tubes, provision is made for a plurality of fixed chutes oriented towards the same means and extending towards the store.

6. Store according to claim 1, characterized in that it comprises two pairs of uprights which act as guides for said supports.

7. Store according to claim 1, characterized in that it has a variable geometry.

\* \* \* \* \*